US011509783B2

(12) United States Patent
Toda

(10) Patent No.: US 11,509,783 B2
(45) Date of Patent: Nov. 22, 2022

(54) INPUT DEVICE AND IMAGE FORMING APPARATUS

(71) Applicant: CANON KABUSHIKI KAISHA, Tokyo (JP)

(72) Inventor: Kozo Toda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/391,148

(22) Filed: Aug. 2, 2021

(65) Prior Publication Data

US 2021/0360114 A1 Nov. 18, 2021

Related U.S. Application Data

(63) Continuation of application No. PCT/JP2020/005013, filed on Feb. 4, 2020.

(30) Foreign Application Priority Data

Feb. 5, 2019 (JP) .............................. JP2019-018771

(51) Int. Cl.
*H04N 1/00* (2006.01)
*G06F 3/02* (2006.01)

(52) U.S. Cl.
CPC ....... *H04N 1/00493* (2013.01); *G06F 3/0227* (2013.01); *H04N 1/00326* (2013.01); *H04N 1/00384* (2013.01); *H04N 1/00411* (2013.01)

(58) Field of Classification Search
CPC ........... H04N 1/00493; H04N 1/00326; H04N 1/00384; H04N 1/00411; H04N 1/00;
(Continued)

(56) References Cited

U.S. PATENT DOCUMENTS 5,493,365 A 2/1996 Matsui et al.
5,526,405 A 6/1996 Toba
(Continued)

FOREIGN PATENT DOCUMENTS

JP  H07-099553 A  4/1995
JP  2000-148360 A  5/2000
(Continued)

OTHER PUBLICATIONS

International Search Report and Written Opinion for International Patent Application No. PCT/JP2020/005013, dated Apr. 21, 2020.

*Primary Examiner* — Amit Chatly
(74) *Attorney, Agent, or Firm* — Venable LLP

(57) ABSTRACT

A numerical key unit 70 mounted in a mounting portion 12 of an image forming apparatus 1 and card reader of inputting information to the image forming apparatus 1 includes a casing 71 mounted on the mounting portion 12, an operating key 100 comprised of a hardware key capable of inputting information on a numerical value, a substrate 73 provided inside the casing 71, a main assembly-side cable 76 connected to a connector 85 mounted on the substrate 73 and electrically connecting the image forming apparatus 1 and the numerical key unit 70, and a first opening 71a through which the main assembly-side cable 76 is inserted. The first opening 71a is provided on a bottom of the casing 71 so that in a thickness direction of the substrate 73, the main assembly-side cable 76 is exposed to an outside of the casing 71 from a surface on a side opposite from a surface where the operating key 100 is provided.

11 Claims, 9 Drawing Sheets

(58) Field of Classification Search
CPC ........ G06F 3/0227; B41J 29/00; G03G 21/16; H01H 9/02
See application file for complete search history.

(56) References Cited

U.S. PATENT DOCUMENTS

| | | |
|---|---|---|
| 5,526,420 A | 6/1996 | Watanabe et al. |
| 2007/0041771 A1 | 2/2007 | Choo et al. |
| 2011/0128247 A1* | 6/2011 | Sensu .................... G06F 3/0227 |
| | | 345/173 |
| 2013/0141748 A1* | 6/2013 | Sakayama .......... H04N 1/00222 |
| | | 358/1.14 |
| 2020/0389563 A1 | 12/2020 | Toba |

FOREIGN PATENT DOCUMENTS

| | | |
|---|---|---|
| JP | 2001-005591 A | 1/2001 |
| JP | 2008-204064 A | 9/2008 |
| JP | 2011-161792 A | 8/2011 |
| JP | 2011161792 A * | 8/2011 |
| JP | 2014-022927 A | 2/2014 |
| JP | 2015-043494 A | 3/2015 |

* cited by examiner

INPUT DEVICE AND IMAGE FORMING APPARATUS

TECHNICAL FIELD

The present invention relates to an input device including a hardware key and to be externally attached to an image forming apparatus and to the image forming apparatus to which this input device is externally attached.

BACKGROUND ART

Conventionally, for example, an image forming apparatus of an electrophotographic type has been widely used as a copying machine, a printer, a facsimile (machine), a multi-function machine having a plurality of functions of these (machines), and the like. In such an image forming apparatus, in order to permit a user to perform input of numerical values such as the number of image formed sheets and a facsimile number or input of processing such as a start, a stop, or the like of image forming processing, for example, an operating portion (display portion) capable of displaying and inputting information on a front side upper portion of an apparatus main assembly is provided. As such an operating portion, for example, one provided with a touch panel where input keys (software keys) are displayed on a display screen and with hardware keys such as numerical keys, a start key, and a stop key has become widespread. The hardware keys are, for example, disposed adjacent to the touch panel.

In the image forming apparatus provided with an operating portion, when the number of sheets subjected to copying and a designation number (telephone number/FAX number) of facsimile are inputted, for example, a numerical key portion as software keys including numerical values from 0 to 9 is displayed on a touch panel. A user performs a touch operation at a numerical key portion of the touch panel, so that the user is capable of performing input of setting of the number of sheets subjected to copying and input of the designation number to the image forming apparatus. When a numeric displayed on the touch panel is touch-operated by the user, a controller acquires coordinate data, of a touched portion by the user, from the touch panel, and converts the coordinate data into numerical (value) information, and then executes a predetermined operation depending thereon.

However, when the input is carried out on the touch panel for receiving the numerical value input by the touch operation, the user cannot feel a physical sense of pushing-down. For this reason, the user performs an input operation while the user confirms the input one numeric by one numeric while looking at the display screen of the touch panel, so that improvement in operating property has been desired. In order to solve this, an image forming apparatus to which an input device (for example, a numerical key unit or a full-key board unit) including a numerical key portion comprised of physical hardware keys is externally connectable has been developed (see Japanese Laid-Open Patent Application (JP-A) 2014-22927). To this image forming apparatus, the user externally connects the input device via a cable and pushes down a hardware key of the numerical key portion of the input device, whereby the user is capable of inputting the number of sheets subjected to copying, the designation number of the facsimile, and the like.

Problem to be Solved by the Invention

However, in the image forming apparatus described in JP-A 2014-22927, the cable connecting the input device and the image forming apparatus is exposed to an outside of the image forming apparatus, so that the cable is liable to interfere with peripheral equipment provided at a periphery of the image forming apparatus. Further, when the cable is exposed, there is a liability that the user erroneously pulls out the cable.

It is an object of the present invention is to provide an input device and an image forming apparatus which are capable of suppressing interference with the peripheral equipment due to exposure of the cable to the outside and of suppressing erroneous pulling-out of the cable by the user while the input device is an input device for external attachment which is capable of being connected to the image forming apparatus by the cable.

Means for Solving the Problem

The input device of the present invention is an input device mounted on a mounting portion of an image forming apparatus and capable of inputting information to the image forming apparatus, and includes a casing mounted on the mounting portion, an opening provided in the casing, a main assembly-side cable provided so as to be exposed from the casing to an outside and electrically connecting the image forming apparatus and the input device, and a numerical key portion comprised of a hardware key capable of inputting information on at least a numerical value, in which the numerical key portion is disposed on an upper surface of the casing in a state in which the casing is mounted on the image forming apparatus, and the opening is provided in a bottom of the casing in the state in which the casing is mounted on the image forming apparatus.

Further, the image forming apparatus of the present invention includes an image forming portion capable of forming an image, an apparatus main assembly which includes the image forming portion therein and which includes a mounting portion, a display portion provided on the apparatus main assembly and capable of displaying information, and the above-described input device.

Effect of the Invention

According to the present invention, it is possible to suppress interference with the peripheral equipment due to exposure of the cable to the outside and the suppress erroneous pulling-out by the user while the input device is an input device for external attachment which is capable of being connected to the image forming apparatus by the cable.

EMBODIMENTS FOR CARRYING OUT THE INVENTION

Figure 1:
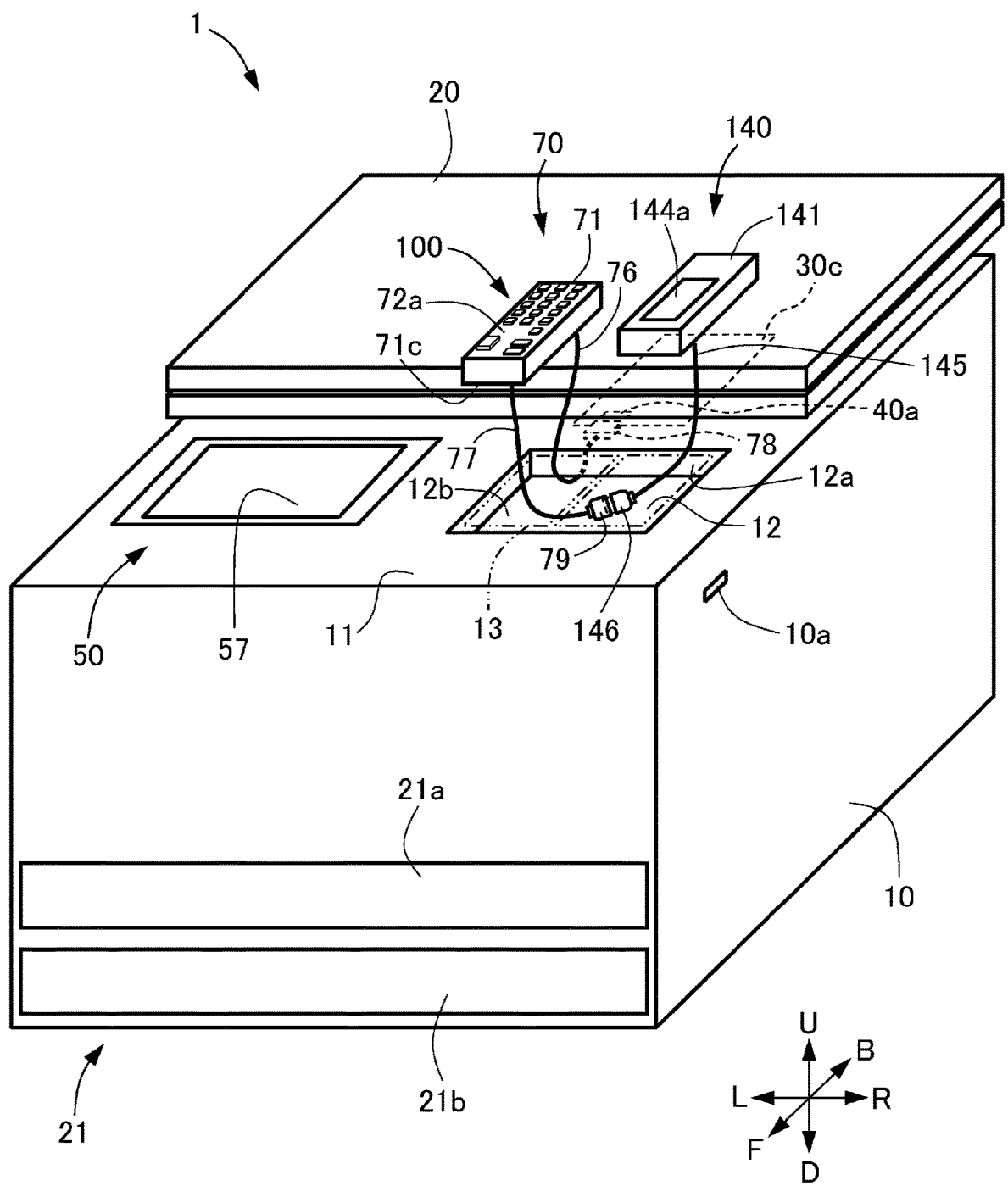
FIG. 1 is a perspective view showing a schematic structure of an image forming apparatus according to this embodiment.

In the following, an embodiment of the present invention will be specifically described with reference to FIGS. 1 to 8. Incidentally, in this embodiment, as shown in each of the figures, toward an image forming apparatus 1, a front side is represented by a front side F, a rear side (rear) is represented by a back side B, a left(-hand) side is represented by L, a right(-hand) side is represented by R, an upper (upward) side is represented by U, and a lower (downward) side is represented by D. Further, the image forming apparatus 1 is constituted so that a user is located to face from the front side F toward the back side B and performs various operations. As shown in FIG. 1, in this embodiment, a side where an operating portion 50 described later is provided is the front side F of the image forming apparatus 1.

In this embodiment, as an example of the image forming apparatus 1, a full-color printer of a tandem type is described. However, the present invention is not limited to one mounted on the image forming apparatus 1 of the tandem type but may also be one mounted on an image forming apparatus of another type, and further, the present invention is not limited to one for a full-color image, but may also be one for a monochromatic image or for a mono-color (single color) image. Or, the present invention can be carried out in various uses, such as printers, various printing machines, copying machines, facsimile machines and multi-function machines.

<Image Forming Apparatus>

As shown in FIG. 1, the image forming apparatus of this embodiment includes an image forming apparatus main assembly (hereinafter, referred to as an apparatus main assembly) 10. The apparatus main assembly 10 includes an image reading portion 20, a sheet feeding portion 21, an image forming portion 22 (see FIG. 3), a sheet discharging portion 23 (see FIG. 3), a controller 30 (see FIG. 3) and an operating portion 50. As shown in FIG. 1, the operating portion 50 is provided above the sheet discharging portion 23 with respect to a vertical direction. Incidentally, on the sheet as a recording material, a toner image is to be formed, and specific examples of the sheet may include plain paper, a resin-made material sheet as a substitute for the plain paper, thick paper, a sheet for an overhead projector, and the like.

The image reading portion 20 is, for example, a flat head scanner device, and is provided at an upper portion of the apparatus main assembly 10. The image reading portion 20 includes an unshown platen glass as an original mounting table, an unshown light source for irradiating an original, placed on the platen glass, with light, and an unshown image sensor for converting reflected light into a digital signal, and the like member. The sheet feeding portion 21 is disposed at a lower portion of the apparatus main assembly 10, and includes sheet cassettes 21a and 21b for stacking and accommodating the sheet such as recording paper, and feeds the sheet to the image forming portion 22 (see FIG. 3).

The image forming portion 22 is provided inside the apparatus main assembly 10 and includes image forming units each including an unshown developing device and an unshown photosensitive drum as an image bearing member, toner bottles, an intermediary transfer unit, a secondary transfer portion, a fixing device, and the like. The image forming portion 22 is capable of forming an image on the sheet fed from the sheet feeding portion 21, on the basis of image information from a controller 30. The sheet discharging portion 23 includes an unshown discharging tray provided on a side downstream of an unshown discharge opening formed in the apparatus main assembly 10. In FIG. 1, although the sheet discharging portion 23 is not shown, this embodiment may also be applied to a so-called in-body discharge constitution such that a discharge tray is provided below the image forming portion 20 with respect to the vertical direction.

Figure 2:
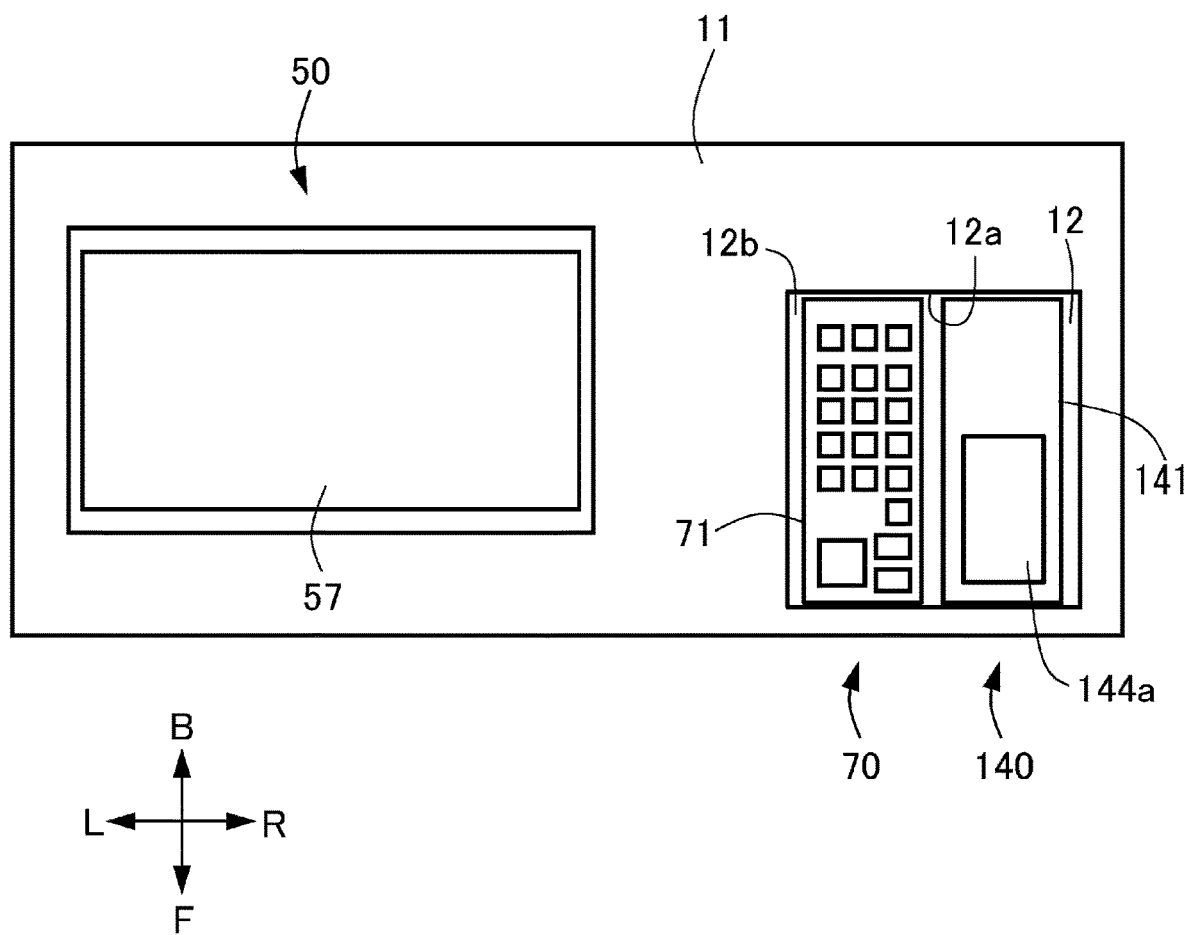
FIG. 2 is a (top) plan view showing an operating surface of the image forming apparatus according to this embodiment.

On the upper side U of the front side F of the apparatus main assembly 10, an operating surface 11 is provided. As shown in FIG. 2, on the operating surface 11, operating surfaces with the operating portion 50, a numerical key unit 70 and an IC card reader 140 are provided toward the upper side U. The numerical key unit 70 and the IC card reader 140 are attached to the apparatus main assembly 10 as a peripheral device of the image forming apparatus 1, and constitutions of these will be described later. At an upper portion of a side surface of the apparatus main assembly 10 on the right side R, a Universal Serial Bus (hereinafter, referred to as a USB) port 10a in which an external device having a USB terminal such as a USB memory is mountable by an operator is provided. Incidentally, this USB port 10a does not have to be provided.

<Controller>

Figure 3:
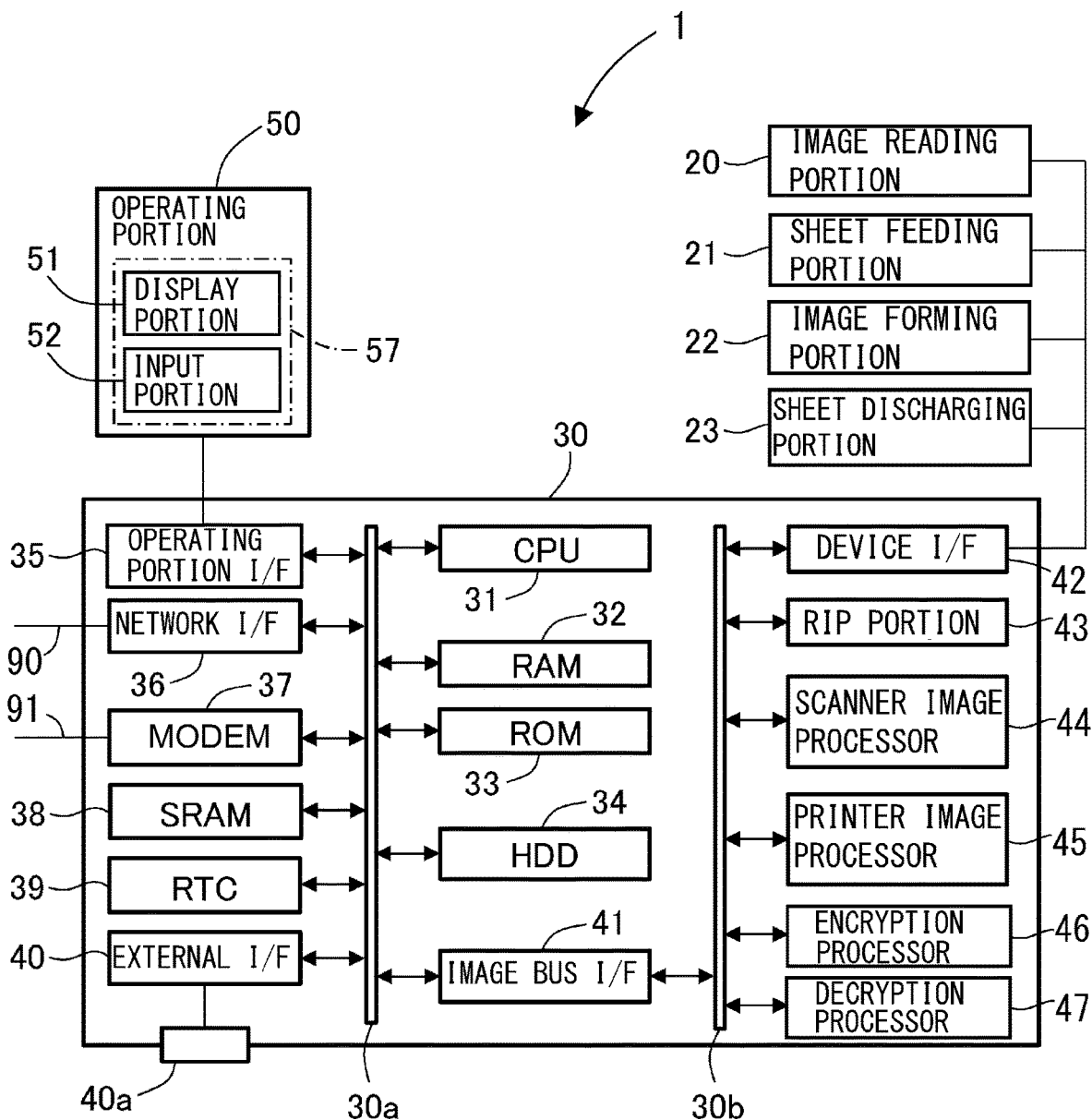
FIG. 3 is a control block diagram of the image forming apparatus according to this embodiment.
Figure 4:
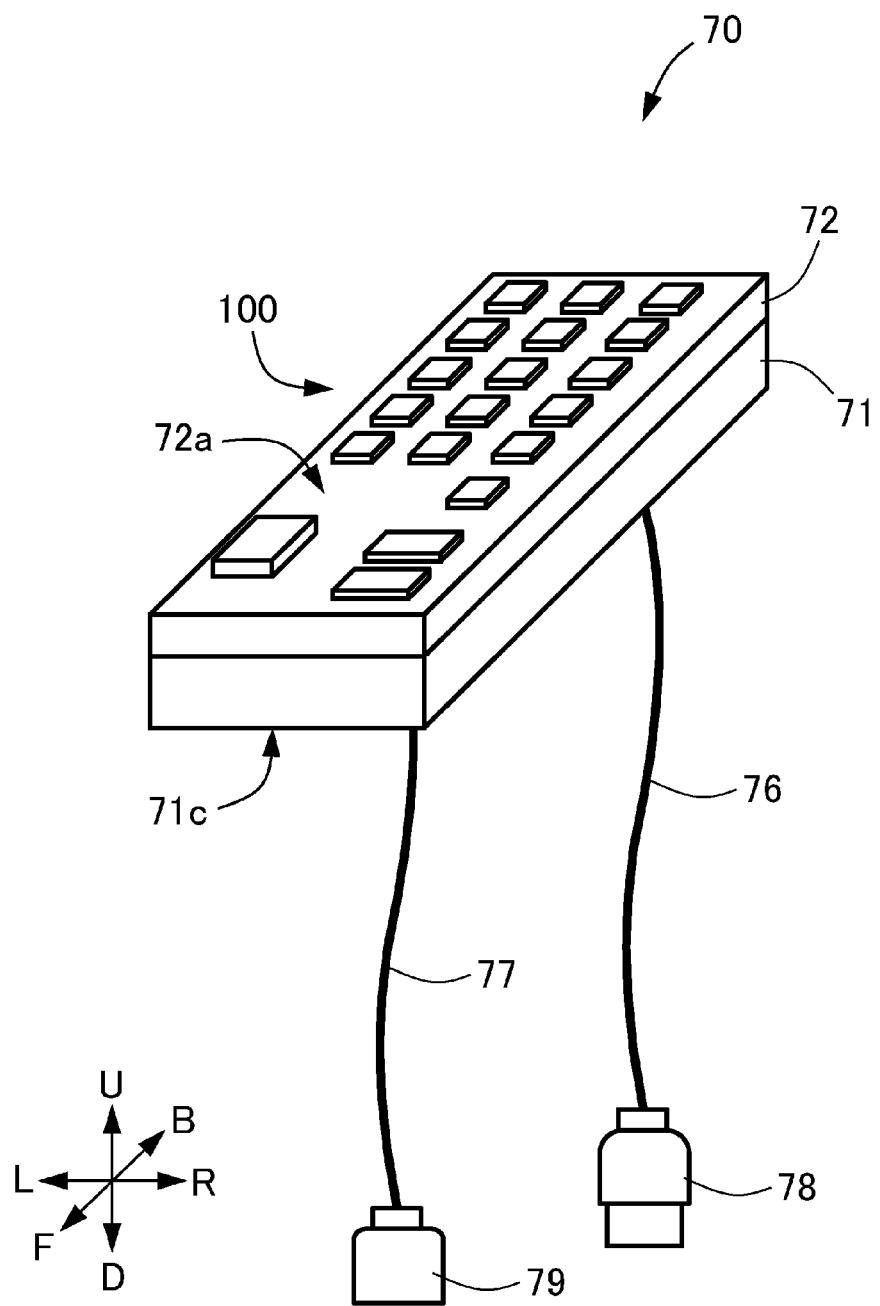
FIG. 4 is a perspective view showing a numerical key unit of the image forming apparatus according to this embodiment.

As shown in FIG. 3, the controller 30 is constituted by a computer, and for example, includes a CPU 31, a RAM 32 for temporarily storing data, a ROM 33 for storing a program for controlling respective portions, and an HDD 34. In this embodiment, the controller 30 includes a system bus 30a and an image bus 30b, and each of the CPU 31, the RAM 32, the ROM 33, and the HDD 34 is connected to the system bus 30a. The CPU 31 is a processor for carrying out integrated control of a entirety of the image forming apparatus 1 and is a main body of a system controller. The CPU 31 carries out, for example, image processing of image data for image formation and carries out network control, and in addition, controls image forming processing by outputting an instruction of image formation to the image forming portion 22.

The RAM 32 is a system work memory for operating the CPU 31 and is also an image memory for temporarily storing the image data, and functions as a main memory, a work area, and the like of the CPU 31. In the RAM 32, setting information in the image forming apparatus 1, and a job log and an operation log when respective processes are performed are stored. In the ROM 33, an image formation control sequence or the like for forming an image on a sheet is stored. In this embodiment, the ROM 33 is, for example, a boot ROM and stores a boot program of a system. The HDD 34 is a hard disk drive and stores a system software, an application, the image data, and the like.

The controller 30 includes an operating portion input/output circuit (I/F) 36, a network input/output circuit (I/F) 35, a modem 37, an SRAM 38, an RTC 39, and an external input/output circuit (I/F) 40, which are each connected to the system bus 30b. The operating portion input/output circuit (I/F) 35 not only carries out transmission of the image data to an operating portion 50 described later and various communications from the operating portion 50 but also inputs, to the CPU 31, information inputted from the operating portion 50 by a user.

The network input/output circuit 36 is connected to a network 90 and carries out input/output of the information. Further, the modem 37 is connected to a public line (network) 91 and functions as a facsimile communication portion capable of transmitting and receiving facsimile, and carries out input/output of the information. By this, the controller 30 is capable of communicating with another PC and server, connected thereto, via the network 90 by the network input/output circuit 36 or via the public line 91 by the modem 37 under instruction of the CPU 31. That is, the image forming apparatus 1 is connected to the network 90 or the public line 91, and carries out input/output of image information and device information.

The SRAM 38 is a nonvolatile storing medium capable of high-speed operation. The RTC 39 is a real time clock, and performs processing in which a current time is continuously counted even in a state in which power is not supplied to the controller 30. The external input/output circuit 40 is a general-purpose input/output circuit such as a USB and connects a general-purpose PC, a memory device, and a numeric key unit 70 described later via a USB connector 40a. In this embodiment, the USB connector 40a is mounted as a receptacle on a control substrate 30c (see FIG. 4). As shown in FIG. 1, the controller 30c is accommodated in the apparatus main assembly 10 so that the USB connector 40a is disposed in the neighborhood of the operating surface 11 of the image forming apparatus 1. To the USB connector 40a, a USB plug 78 of a main assembly-side cable 76 of the numerical key unit 70 is connected. Incidentally, an arrangement of the control substrate 30c is not limited to this arrangement, and a constitution in which the control substrate 30c is provided on the back side B (rear (surface) side) of the image forming apparatus 1 may also be employed. In the case of this constitution, this constitution may only be required to be a constitution in which only the USB connector 40a is provided on the front side F and in which the USB connector 40a and the control substrate 30c are connected by a cable may also be employed.

As shown in FIG. 3, the controller 30 includes an image bus input/output circuit (I/F) 41. The image bus input/output (I/F) 41 is a bus bridge which connects the system bus 30a and the image bus 30b transferring the image data at high speed and which converts a data structure. The image bus 30b is constituted by, for example, a PCI bus or an IEEE 1394.

As shown in FIG. 3, the controller 30 includes a device input/output circuit (I/F) 42, a RIP portion 43, a scanner image processing portion 44, an printer image processing portion 45, an encryption processing portion 46, and a decryption processing portion 47, which are each connected to the image bus 30b. The device input/output circuit 42 connects the image reading portion 20 and the image forming portion 22 to the controller 30 and performs a synchronous line and a non-synchronous line of the image data. The RIP portion 43 is a raster image processor and develops PDL data into a bit-mapped image. The scanner image processing portion 44 performs correction, processing and editing of the image data. The printer image processing portion 45 subjects print output image data to printer correction, resolution conversion, and the like. The encryption processing portion 46 subjects input data including the image data to encryption processing. The description processing portion 47 subjects encrypted data to description processing.

The operating portion 50 is the one for performing an operation by the operator, and includes a display portion 51 for displaying various pieces of information and an inputting portion 52 where the operator performs operation input. In this embodiment, the operating portion 50 includes, for example, a panel surface 57 of a touch input type where the display portion 51 which is a liquid crystal module and the inputting portion 52 which is a touch panel module are unified. On this panel surface 57, a start key capable of inputting information for starting predetermined processing and software keys capable of inputting numerical values of 0 to 9 are capable of being displayed at the display portion 51, and the operator is capable of inputting the information by the inputting portion 52. Incidentally, the operating portion 50 is an example of an operating panel.

As shown in FIG. 3, the operating portion 50 is provided on the operating surface 11 of the apparatus main assembly 10.

Further, as shown in FIG. 1, the operating portion 50 is provided on a front side F than a central portion of the image forming apparatus 1 with respect to a front-rear direction. The operating portion 50 is formed in, for example, a rectangular flat plate shape, and is fixedly provided to the apparatus main assembly 10 with a panel surface 57, toward an upper side U, constituted by laminating the inputting portion 52 on the display portion 51 (see FIG. 3). The software keys displayed on the panel surface 57 are input keys for detecting input of the keys by touch operation of respective display portions. Incidentally, the shape of the operating portion 50 is not limited to the rectangular flat plate shape, but may also be another shape. Further, a direction of the display portion 51 and the inputting portion 52 is not limited to the upper side U, but may also be another direction, and for example, these modules may also be provided so as to be tiltable in an up-down direction relative to the apparatus main assembly 10 and so that the direction of the panel surface 57 is changeable.

<Numerical Key (Ten Key) Unit>

Next, a hardware constitution and an operation of the numeric key unit 70 as an input device which is one of peripheral devices connected to the image forming apparatus 1 will be described. As shown in FIG. 3, the numerical key unit 70 is provided so as to be adjacent to the operating portion 50 on the right side. This numeric key unit 70 is mounted to the image forming apparatus 1 including the operating portion 50 capable of inputting information, and is capable of inputting information to the image forming apparatus 1 separately from the operating portion 50. As an example of different uses for different purposes in information input between the operating portion 50 and the numeric key unit 70, setting of a density, a size, and the like relating to image formation is inputted from the operating portion 50, and numerical values such as the number of image-formed sheets and a designation number of a facsimile are inputted from the numeric key unit 70. Incidentally, in the present specification, the numerical key is a concept including either of the case where the numerical key shows 10 numerical keys from 0 to 9, the case where the numerical key shows 12 keys in which "*" and "#" are added to the (10) numerical keys, and the case where the numerical key shows about 20 keys in which numerical keys include four arithmetic operators, a "NumLock", and the like.

The numerical key unit 70 includes a casing 71, an upper surface cover 72 provided on an upper surface of the casing 71, and operating keys (numerical value key portion) 100 provided on the upper surface cover 72. The operating keys 100 are disposed on an upper surface (upper surface of the casing) 72a of the upper surface cover 72 of the casing 71 in a state in which the casing 71 is mounted on the apparatus main assembly 10 of the image forming apparatus 1. An arrangement of the operating keys 100 will be described later. As shown in FIG. 1, a mounting portion 12 is disposed adjacent to the operating portion 50, and the casing 71 is adjacent to the right side of the operating portion 50 of the image forming apparatus 1 and is mounted on the mounting portion 12 by, for example, screwing, bonding, or the like. Further, the operating portion 50 and the mounting portion 12 are disposed on the front (surface) side of the apparatus main assembly 10. By this, the user can use the numerical key unit 70 easily by utilizing his (her) right hand while looking at the operating portion 50.

Figure 5:
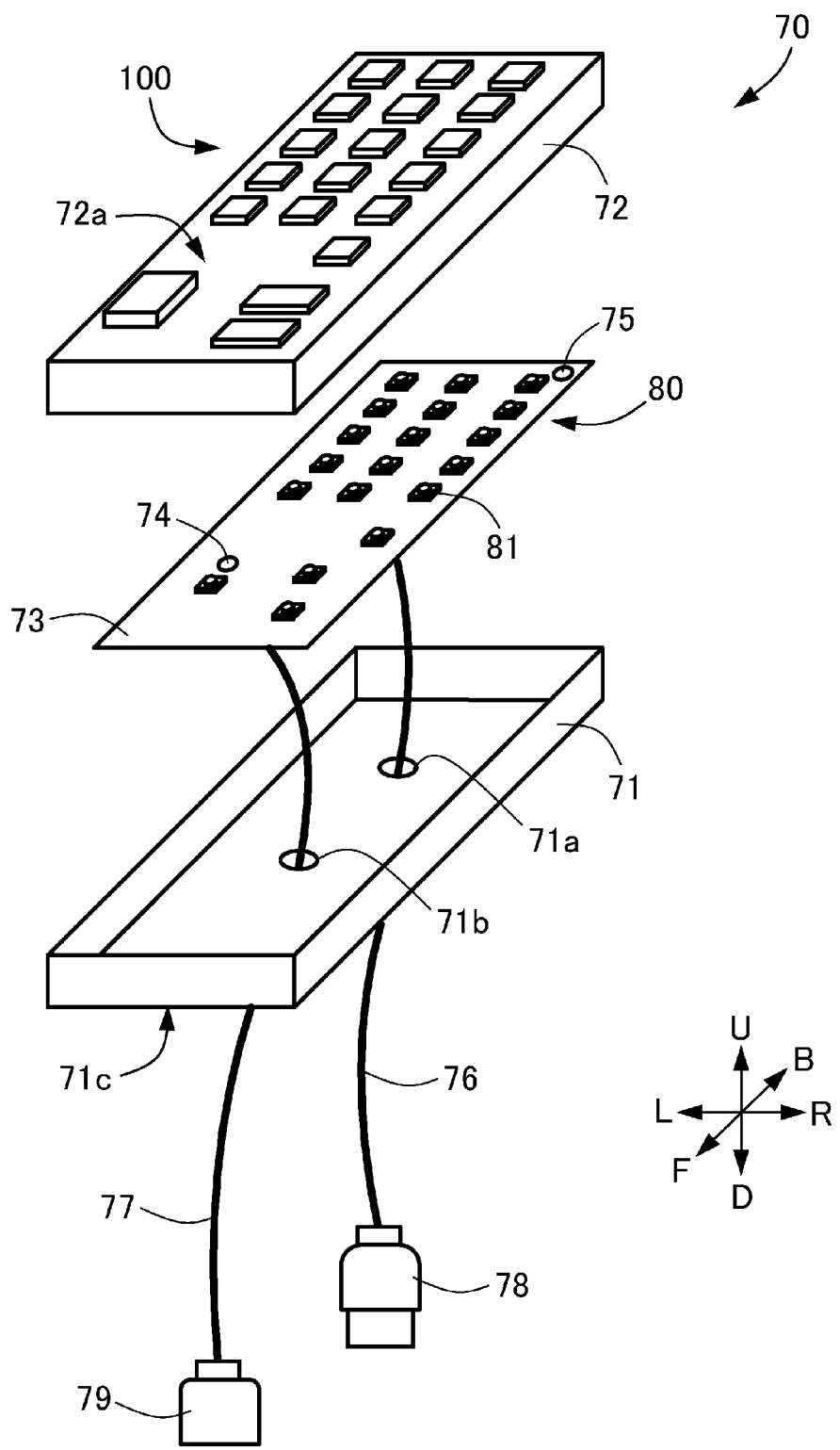
FIG. 5 is an exploded perspective view showing the numerical key unit of the image forming apparatus according to this embodiment.

As shown in FIG. 5, the numerical key unit 70 includes a substrate 73, a hardware key unit 80 and LEDs 74 and 75 which are provided on the substrate 73, the main assembly-side cable 76, and an external-side cable 77. The substrate 73 includes an electric circuit for controlling the numerical key unit 70. The main assembly-side cable 76 is a USB cable provided so as to project from the casing 71 to an outside, and is provided with a USB plug (plug) 78 which is a USB terminal at a tip thereof. That is, the main assembly-side cable 76 is inserted through a first opening 71a described later, and is provided so as to project from the casing 71 to the outside. By this, the image forming apparatus 1 and the numerical key unit 70 are electrically connected via the main assembly-side cable 76.

The external-side cable 77 is provided separately from the main assembly-side cable 76, and is a USB cable provided so as to project from the casing 71 to the outside and is provided with a USB receptacle (receptacle) 79 which is a USB terminal at a tip thereof. That is, the main assembly-side cable 76 which is one of the main assembly-side cable 76 and the external-side cable 77 includes the USB plug 78 at the tip, and the external-side cable 77 which is the other of the main assembly-side cable 76 and the external-side cable 77 includes the USB receptacle 79 at the tip. However, on the contrary, the external-side cable 77 which is one of the main assembly-side cable 76 and the external-side cable 77 may also be provided with the USB plug at the tip, and the main assembly-side cable 76 which is the other of the main assembly-side cable 76 and the external-side cable 77 may also be provided with the USB receptacle at the tip. The USB plug 78 and the USB receptacle 79 have shapes and constitutions based on a USB standard. Incidentally, projected positions of the main assembly-side cable 76 and the external-side cable 77 from the casing 71 will be described later.

The hardware key unit 80 includes a plurality of hardware keys capable of inputting by being pushed down. In this embodiment, in order to provide operation feeding (for example, click feeling) of the operation keys 100 to the user, as an example of the numerical keys, tactile switches 81 are supplied. The tactile switches 81 are disposed one by one at positions opposing the inside of the casing 71 of the operation keys 100, respectively, on an inside of the casing 70a. Each of the tactile switches 81 is constituted by, for example, a protective cover, a plunger pushed by the operation key 100, a reversing spring not only creating the click feeling but also functioning as a movable contact, and a base portion including two contacts. By this, a corresponding tactile switch 81 is pushed down by pushing down the operating key 100, so that a value such as a numerical value is capable of being inputted. That is, the operating keys 100 and the tactile switches 81 are an example of hardware keys capable of inputting information on numerical values of at least 0 to 9 by the user. Incidentally, as the tactile switches 81, an existing or new appropriate constitution can be applied, and thus will be omitted from detailed description.

A first LED 74 is provided on a back side of a start key 131 (see FIG. 6) and is caused to emit light on the basis of a signal from the controller 30 (see FIG. 2). The controller 30 causes the first LED 74 to emit light in the case where the image forming portion 22 (see FIG. 3) is in an image formable state, and turns off the first LED 74 in the case where the image forming portion 22 is not in the image formable state.

A second LED 75 is provided on a back side of a setting key 121 (see FIG. 6) described later in the casing 71 and is caused to emit light on the basis of a signal from the controller 30 (see FIG. 2). The controller 30 causes the second LED 75 to emit light in the case where a mode of the image forming apparatus 1 is set at a predetermined mode, for example, a voice input mode, and turns off the second LED 75 in the case where the mode of the image forming apparatus 1 is not the predetermined mode.

Figure 6:
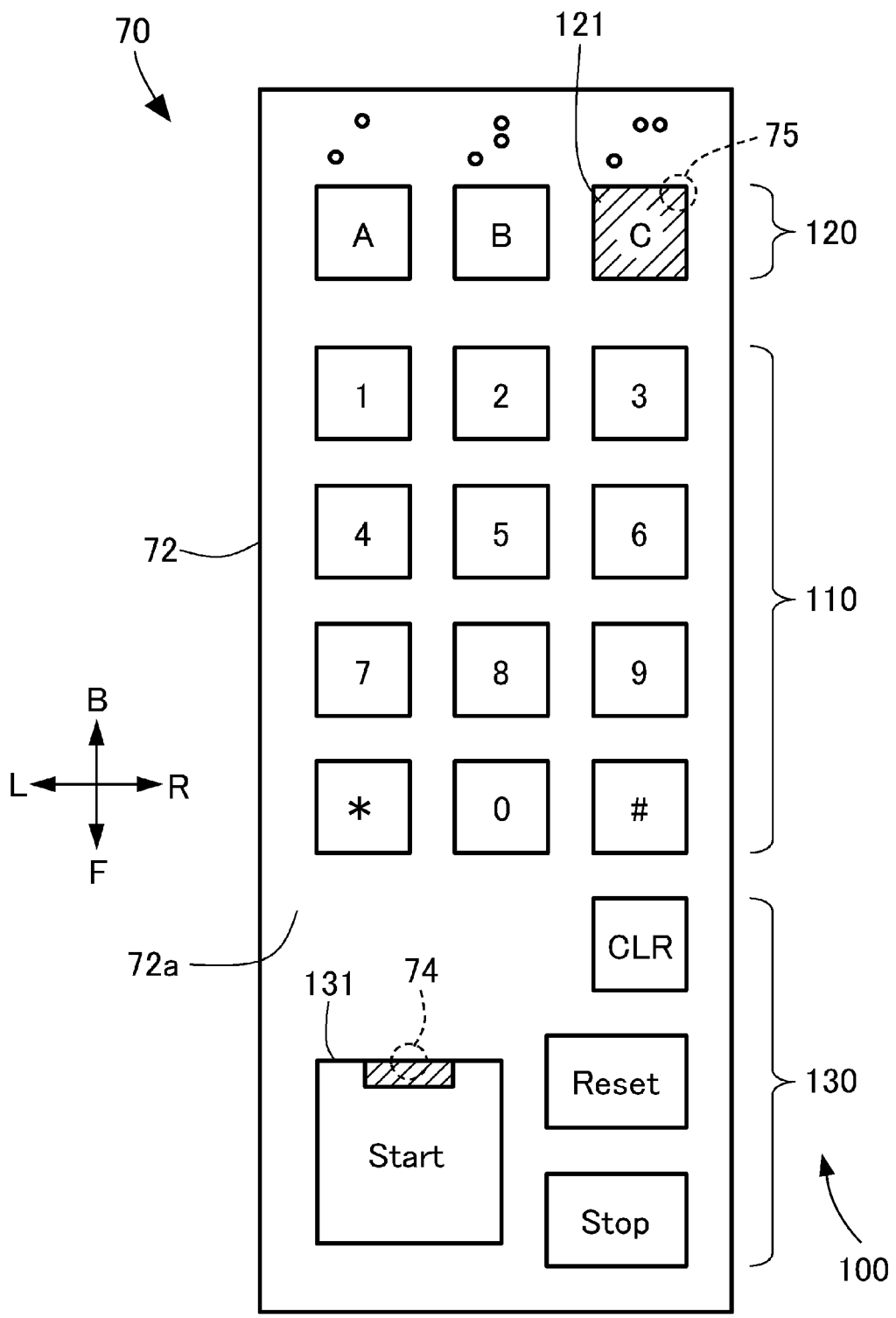
FIG. 6 is a plan view of the numerical key unit of the image forming apparatus according to this embodiment.

As shown in FIG. 6, the operating keys 100 includes a numerical key portion 110, an operating key portion 130, and a setting key portion 120. Here, FIG. 6 is a schematic view in which the numerical key unit 70 is viewed from the front side, and is the schematic view in which the numerical key unit 70 is viewed from a direction parallel to a pushing-down direction of the respective hardware keys. Incidentally, the front side view (position) in this embodiment is a position where numerical values provided for the numerical keys are properly viewed in the up-down direction. The numerical key portion 110 includes a plurality of hardware keys capable of inputting information on at least numerical values. The operating key portion 130 includes, for example, the start key 131 comprised of a hardware key capable of inputting information for starting predetermined processing. The predetermined processing herein is, for example, copying processing of the image forming apparatus 1, transmission processing of the facsimile, or image reading processing of the image reading portion 20, and a start of execution of these pieces of the processing can be instructed by pushing-down of the start key 131. The start key 131 is disposed in front of the numerical key portion 110 in a state in which the casing 71 is mounted on the image forming apparatus 1. The setting key portion 120 includes, for example, the setting key 121 comprised of a hardware key capable of inputting information for setting the predetermined mode (for example, the voice input mode in which an inputting operation is performed by voice of the user). That is, the operating keys 100 include the hardware keys corresponding to the software keys displayed on the display portion 51.

Here, the numeric key unit 70 in this embodiment a dedicated numeric key unit 70 designed, for the image forming apparatus 1, as one of option devices of the image forming apparatus 1. Uses of this dedicated numeric key unit 70 are principally, for example, input of a designation number (FAX number) when facsimile transmission is made. The dedicated numeric key unit 70 is designed for principal purpose of inputting the designation number of the facsimile transmission, and therefore, an arrangement of the numeric key portion 110 is similar to an arrangement of a telephone. That is, the arrangement of the numeric key portion 110 of the dedicated numeric key unit 70 is similar to a standard arrangement shown in Recommendation E.161 of ITU-T (International Telecommunication Union-Telecommunication Standardization Sector). Accordingly, the numerical key portion 110 includes a numerical key portion comprised of a hardware keys capable of numerical value input and hardware keys capable of inputting "*" and "#". Here, the hardware keys of "*" and "#" are keys effective in the case where the image forming apparatus 1 is in a FAX mode. For example, in the case where the image forming apparatus 1 is in the FAX mode, the user operates the hardware keys of "*" and "#", whereby information of "*" and "#" is transmitted to the controller 30. That is, as shown in FIG. 6, in the numeric key portion 110, the numerical keys from 1 to 9 are adjacently disposed so that a rearmost side B includes 1 to 3, a front side F thereof includes 4 to 6 and a further front side F thereof includes 7 to 9. Further, a numerical key of 0 is disposed on the front side F of the numerical key of 8, and the "*" key and the "#" key and disposed on left and right sides thereof.

In other words, with respect to the 10 hardware keys from 0 to 9, a row of the numerical keys of 1, 2 and 3 is disposed on the rearmost side, and a row of the numerical keys of 4, 5 and 6 is disposed on a side in front of the row of 1, 2 and 3. Further, a row of the numerical keys of 7, 8 and 9 is disposed on a side in front of the row of the numerical keys 4, 5 and 6. Further, the hardware key of 0 is disposed on a side in front of the row of the hardware keys of 7, 8 and 9. Further, when these numerical keys from 0 to 9 are viewed in column, from a left(-hand) side, these numerical keys are arranged in the order of a column of the numerical keys 1, 4 and 7, a column of the hardware keys 2, 5, 8 and 0, and a column of the numerical keys 3, 6 and 9. That is, the numerical keys from 1 to 9 are aligned and arranged in a matrix of 3×3 in the case where the dedicated numerical key unit 70 is viewed from the front side, so that from an upper stage in a column direction, the numerical keys from 1 to 3, the numerical keys from 4 to 6, and the numerical keys from 7 to 9 are sequentially disposed, and the numerical key of 0 is disposed on a further lower stage than the row of the numerical keys from 7 to 9. Incidentally, the numerical key of 0 may also be disposed in the column of the numerical keys of 1, 4 and 7 or in the column of the hardware keys of 3, 6 and 9, and the arrangement of the "*" key and the "#" key may appropriately be changed. Further, in this numeric key unit 70, electronic calculator input is not a principal purpose, and therefore, four arithmetic operators such as +, -, and the like are not provided. Thus, this numeric key unit 70 is not designed for the purpose of being connected to a PC, and therefore, is different in key arrangement from a general-purpose numeric key unit connectable to unspecified PCs and so on.

Here, the key arrangement of the general-purpose numeric key unit is the same as principally the key arrangement of the electronic calculator. That is, an arrangement of hardware keys in the general-purpose numeric key unit is similar to the arrangement to hardware keys defined in ISO (International Standards Organization). That is, in the general-purpose numerical key unit, with respect to the 10 hardware keys from 0 to 9, a row of the numerical keys of 7, 8 and 9 is disposed on the rearmost side, and a row of the numerical keys of 4, 5 and 6 is disposed on a side in front of the row of 7, 8 and 9. Further, a row of the numerical keys of 1, 2 and 3 is disposed on a side in front of the row of the numerical keys 4, 5 and 6. That is, in the general-purpose numerical key unit, the numerical keys from 1 to 9 are aligned and arranged in a matrix of 3×3 in the case where the numerical key unit 70 is viewed from the front side, so that from an upper stage in a column direction, the numerical keys from 7 to 9, the numerical keys from 4 to 6, and the numerical keys from 1 to 3 are sequentially disposed, and the numerical key of 0 is disposed on a further lower stage than the row of the numerical keys from 1 to 3. Further, the hardware keys of 0 and 00 is disposed on a side in front of the row of the hardware keys of 1, 2 and 3. Further, when these numerical keys from 1 to 9 are viewed in column, from a left(-hand) side, these numerical keys are arranged in the order of a column of the numerical keys 1, 4 and 7, a column of the hardware keys 2, 5 and 8, and a column of the numerical keys 3, 6 and 9. The hardware keys of 0 and 00 are disposed so as to bridge over the column of the numerical keys of 1, 4 and 7 and the column of the numerical keys of 2, 5 and 8, or are disposed in the same row as the row of 1, 4 and 7. Further, on a right(-hand) side and on a rear side of the numerical keys, four arithmetic operators a functional key portions, and the like are disposed. Thus, the numeric key unit 70 and the general-purpose numeric key unit are different from each other in numerical key arrangement, function key, and the like provided therein.

Further, in this embodiment, a layout of the numerical key portion 110 is a key arrangement of a telephone type in which numerical values on the rear (back) side B are small and numerical values on the front side F are large. However, the layout is not limited to this, and the layout of the numerical key portion 110 may also be a key arrangement similar to the key arrangement of the above-described general-purpose numerical key unit in which the numerical values on the rear side B are large and the numerical values on the front side F are small.

<Control System of Peripheral Device>

Next, a control system of a peripheral device connected to the image forming apparatus 1 will be described using FIG. 7. In this embodiment, as the peripheral device connected to the image forming apparatus, the numerical key unit 70 and the IC card reader 140 are connected. Incidentally, the peripheral device in this embodiment is, for example, a provided (apparatus) usable in connection to the image forming apparatus 1, and is, for example, usable even when each of the numerical key unit 70 and the IC card reader 140 is connected along to the image forming apparatus 1.

Figure 7:
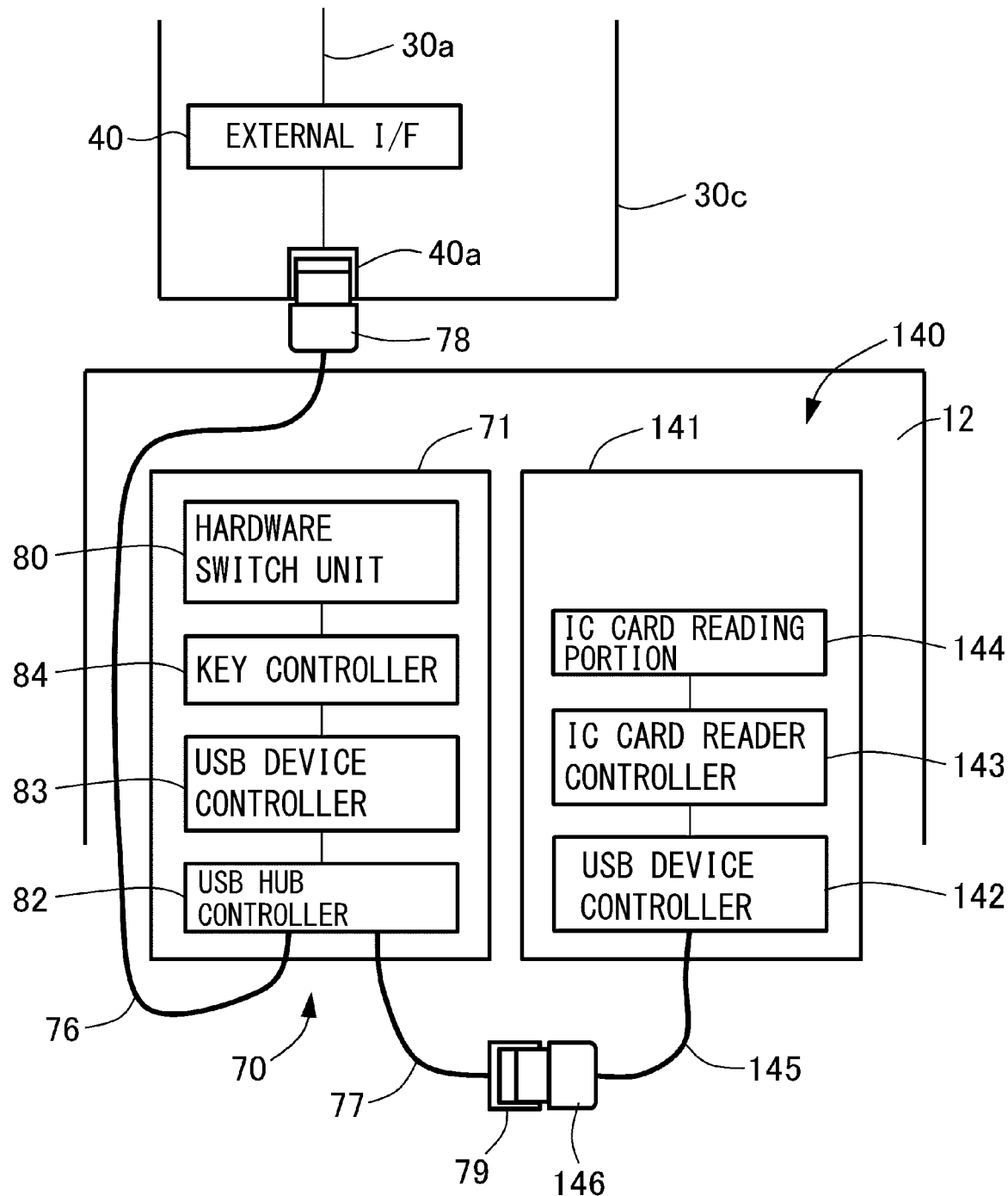
FIG. 7 is a control block diagram of the numerical key unit and an IC card reader of the image forming apparatus according to this embodiment.

As shown in FIG. 7, the substrate 73 (see FIG. 5) of the numerical key unit 70 is provided with a USB hub controller 82, a USB device controller, and the numerical key unit 80. The USB hub controller 82 provides a USB hub function of USB connection and is capable of expanding to USB connection. The USB device controller 83 is the one for carrying out device control of USB communication in the USB connection. A key controller 84 is the one for detecting key input by the hardware key unit 80.

To the USB hub controller 82, for connection to a USB host side, the main assembly-side cable 76 and the USB plug 78 of the tip thereof are connected. Further, with the USB hub controller 82, the USB device controller 83 is connected to a port of the USB hub. Further, to another port of the USB hub of the USB hub controller 82, for connection to another USB device, the external-side cable 77 and the USB receptacle 79 of the tip thereof are connected.

On the other hand, the IC card reader 140 includes a casing 141, a USB device controller 142, an IC card reader controller 143, an IC card reader 144, and a connecting cable 145. Further, the connecting cable 145 is a USB cable provided so as to project from the casing 141 to an outside and is provided with a USB plug 146 which is a USB terminal at a tip thereof. The USB plug 146 has a shape and a constitution based on the USB standard. The USB device controller 142 is the one for carrying out device control of the USB communication in the USB connection. To the USB device controller 142, the connecting cable 145 and the USB plug 146 of the tip thereof are connected for connection with the USB host side.

The IC card reading portion 144 is capable of magnetically reading information of an IC card and is the one for reading information of an IC chip of the IC card to which the user comes close (touch), and includes a reading surface 144a provided on an upper surface side of the casing 141 (see FIG. 1). The IC card reader controller 143 is the one for controlling reading of IC card information by the IC card reading portion 144. As shown in FIG. 1, the connecting cable 145 projects from a surface opposite from the reading surface 144a of the IC card reading portion 144 of the casing 141.

As shown in FIG. 7, the USB plug 78 of the numerical key unit 70 is connected to the USB connector 40a of the image forming apparatus 1, whereby the USB plug 78 is USB-connected to the image forming apparatus 1 via the main assembly-side cable 76. Further, the USB plug 146 of the IC card reader 140 is connected to the USB receptacle 79 of the numerical key unit 70, whereby the USB plug 146 is USB-connected to the numerical key unit 70 via the connecting cable 145 and the external-side cable 77. By carrying out these USB connections, USB communication between the image forming apparatus 1, the numerical key unit 70, and the IC card reader 140 becomes possible. Key input information processed by the key controller 84 is read by the CPU 31 of the controller 30 of the image forming apparatus 1 via USB connection communication. Further, the IC card reading information processed by the IC card reader controller 143 is read by the CPU 31 of the controller 30 of the image forming apparatus 1 via the USB connection communication.

As described above, the peripheral device of the image forming apparatus 1 generally has a constitution in which the peripheral device is connected to the image forming apparatus 1 via the cable, the plug, and the receptacle and functions. Here, as shown in part (a) of FIG. 9, for example, it is assumed that a peripheral device 150 such as a key board unit (input device) or the IC card reader includes a cable 151 for connecting the peripheral device 150 to the image forming apparatus 1 and a receptacle 152 for enabling connection of another peripheral device. The cable 151 is a cable for carrying out connection to the image forming apparatus 1, and is provided so as to be pulled out by being projected from a side surface of the peripheral device 150 on the rear side B to an outside. The receptacle 152 is provided in this peripheral device 150 in order to permit connection of another peripheral device to this peripheral device 150. In general, on an upper surface of the peripheral device, keys, a display device, and the like for permitting the user to perform various operations are disposed. For this reason, the cable and the receptacle are disposed on the side surface of the peripheral device in many instances. In this embodiment, for example, in consideration of arrangement of another peripheral device on the right side R of this peripheral device 150, the cable and the receptacle are disposed on the right side R of the peripheral device 150.

Figure 9:
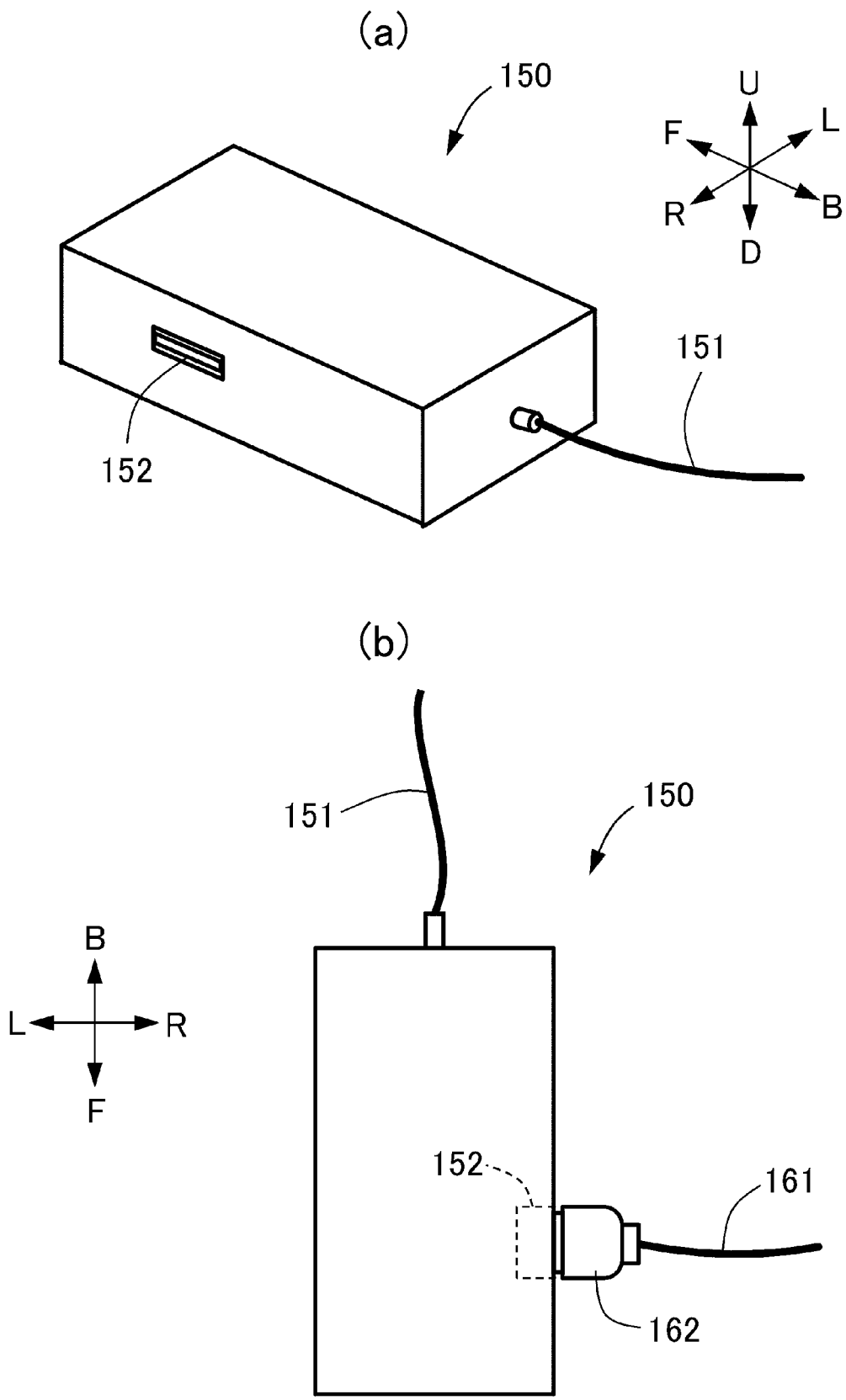
FIG. 9 includes views showing a schematic structure of a peripheral device of another image forming apparatus in which part (a) is a perspective view, and part (b) is a plan view.

As shown in part (b) of FIG. 9, to the receptacle 152 of this peripheral device 150, a plug 162 of a cable 161 of another peripheral device is connected. However, in this case, either of the cable 151 of the peripheral device 150 and the plug 162 of another peripheral device are in a state in which the plug is projected from a side surface of the peripheral device 150 sideward. For this reason, in the case where the peripheral device 150 is mounted and disposed on the image forming apparatus 1, there is a liability that projected portions such as the cable and the plug interfere with a peripheral structure and another peripheral device. Further, in order to avoid interference by such projected portions, there is a need to largely ensure the mounting portion 12 for the peripheral device, so that there is a possibility that a degree of freedom of design of the inside of the apparatus main assembly 10 lowers and that a design property of an outer appearance is impaired. On the other hand, in this embodiment, the cable of the peripheral equipment is prevented from projecting from the side thereof, so that upsizing of the apparatus main assembly 10 of the image forming apparatus 1 with the connection by the cable is suppressed.

<Main Assembly-Side Cable and External-Side Cable>

Figure 8:
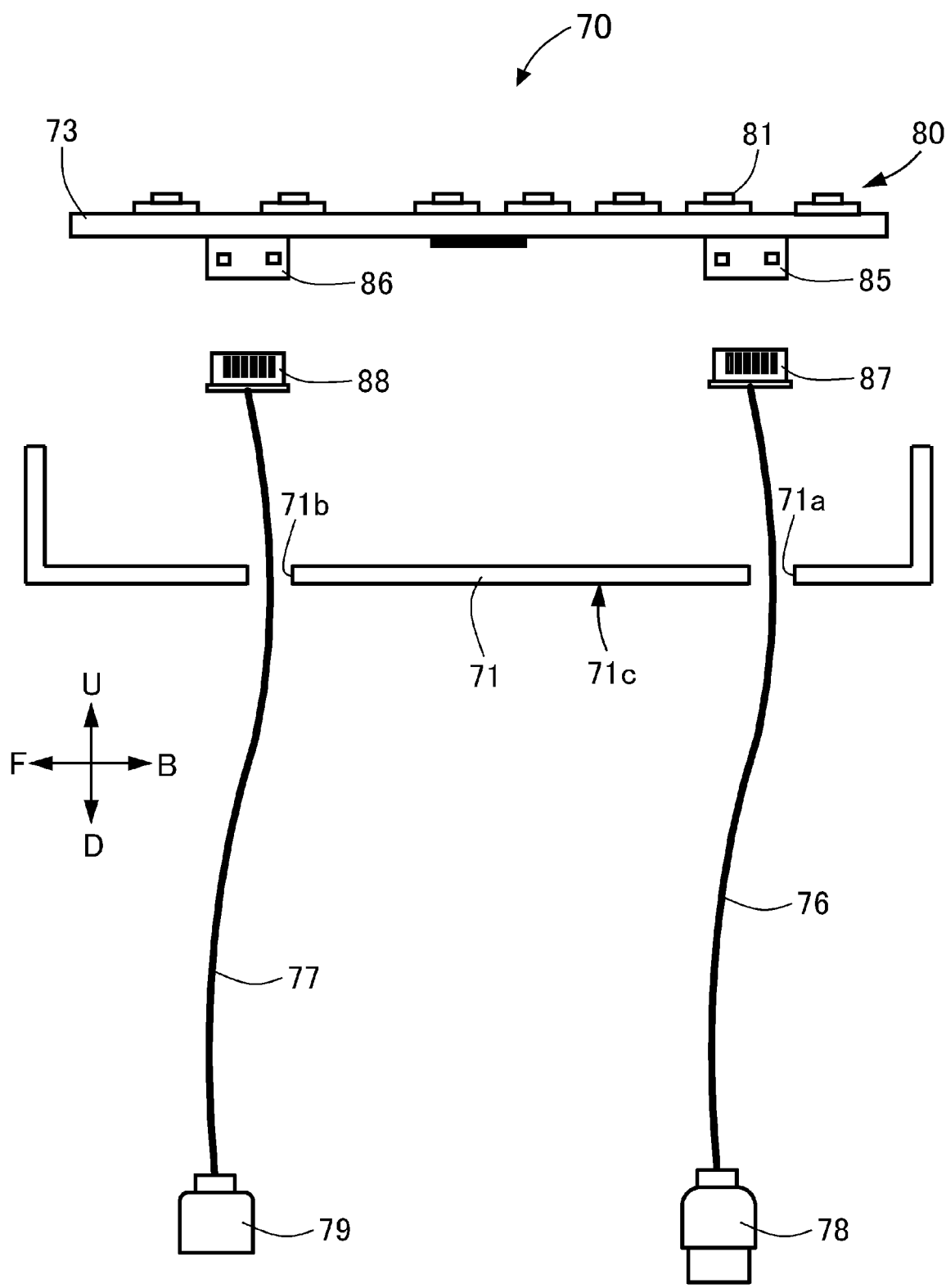
FIG. 8 is a side view showing a substrate and a casing of the numerical key unit of the image forming apparatus according to this embodiment.

Next, a mounting structure of the main assembly-side cable 76 and the external-side cable 77 of the numerical key unit 70, for solving such a problem, to the casing 71 will be described in detail. As shown in FIG. 5, the main assembly-side cable 76 and the external-side cable 77 project from an opposite surface toward a surface where the operating keys 100 of the casing 71. As shown in FIGS. 5 and 8, a base terminal (tip) of each of the main assembly-side cable 76 and the external-side cable 77 is connected to the back (surface) side of the substrate 73, i.e., to the surface opposite from a mounting surface of the hardware key unit 80 of the substrate 73. That is, with respect to the thickness direction of the substrate 73, the base terminal of each of the main assembly-side cable 76 and the external-side cable 77 is mounted on the side opposite from the mounting surface of the tactile switches 81. In the bottom of the casing 71, the first opening (opening portion) 71a and a second opening (another opening portion) 71b which penetrate through an inside and an outside of the casing 71 are formed. That is, the openings 71a and 71b are provided in the bottom 71c of the casing 71 in a state in which the casing 71 is mounted on the apparatus main assembly 10 of the image forming apparatus 1. The main assembly-side cable 76 passes through the first opening 71a, whereby the main assembly-side cable 76 is provided so as to project from an inner side toward an outer side of the casing 71, so that the main assembly-side cable 76 and the USB plug 78 are pulled out to the outside of the numerical key unit 70. Further, the external-side cable 77 passes through the second opening 71b, whereby the external-side cable 77 is provided so as to project from the inner side toward the outer side of the casing 71, so that the external-side cable 77 and the USB receptacle 79 are pulled out to the outside of the numerical key unit 70. That is, the first opening 71a and the second opening 71b are provided in the casing 71c so that in the thickness direction of the substrate 73, the main assembly-side cable 76 and the external-side cable 77 are exposed to the outside of the casing 71 from the bottom 71c which is the side opposite from the surface where the operating keys 100 are provided.

As shown in FIG. 8, on the back surface side of the substrate 73, i.e., on the surface on the side opposite from the mounting surface of the hardware key unit 80 of the substrate 73, a first general-purpose connector receptacle 85 and a second general-purpose connector receptacle 86 are mounted. On the other hand, in the main assembly-side cable 76, to an opposite-side end portion of the USB plug 78, a first general-purpose connector plug 87 is attached. The first general-purpose connector plug 87 is connected to the first general-purpose connector receptacle 85 of the substrate 73, whereby the main assembly-side cable 76 and the substrate 73 are connected to each other. Further, in the external-side cable 77, to an opposite-side end portion of the USB receptacle 29, a second general-purpose connector plug 88 is attached. The second general-purpose opening or plug 88 is connected to the second general-purpose connector receptacle 86 of the substrate 73, whereby the external-side cable 77 and the substrate 73 are connected to each other.

On the other hand, as shown in FIG. 1, on the right side R of the operating portion 50 on the operating surface 11, the mounting portion 12 facing toward the upper side U on the right side R of the front side F of the apparatus main assembly 10 adjacent to the operating portion 50 is provided. The mounting portion 12 forms a space (accommodating portion) in a recessed shape relative to the operating side 11, in which peripheral devices such as the numerical key unit 70 and the IC card reader 140 are accommodated. That is, the mounting portion 12 has the recessed shape such that the numerical key unit 70 and the IC and reader 140 are accommodated and mounted. Incidentally, in the case where peripheral equipment such as the numerical key unit 70 or the IC card reader 140 is not mounted on the mounting portion 12, a cap 13 is provided so as not to impair an outer appearance, so that the mounting portion 12 is hidden from the outside.

When the numerical key unit 70 and the IC card reader 140 are mounted on the mounting portion 12, the USB plug 78 of the main assembly-side cable 76 of the numerical key unit 70 is connected to the USB connector 40a of the control substrate 30c. At this time, the main assembly-side cable 76 is, for example, passed below a side wall 12a of the rear side B of the mounting portion 12 and is wired from the numerical key unit 70 to the control substrate 30c. To the receptacle 79 of the external-side cable 77 of the numerical key unit 70, the USB plug 146 of the connecting cable 145 of the IC card reader 140 is connected. The main assembly-side cable 76, the external-side cable 77, and the connecting cable 145 which are connected are accommodated on the bottom of the mounting portion 12, i.e., in a space between the bottom 12b of the mounting portion 12 and the bottom 71c (see FIG. 4) of the numerical key unit 70. Thereafter, the casing 71 of the numerical key unit 70 and the casing 141 of the IC card reader 140 are mounted on the upper side U of the main assembly-side cable 76, the external-side cable 77, and the connecting cable 145 in the mounting portion 12. The numerical key unit 70 and the IC card reader 140 are fixed to the mounting portion 12 by, for example, screwing, bonding, or the like. Further, as shown in FIG. 2, the numerical key unit 70 and the IC card reader 140 can be installed inside the mounting portion 12 so as to be adjacent to each other.

Thus, in this embodiment, to the image forming apparatus 1, the IC card reader 140 is attached as the peripheral device usable in connection to the apparatus main assembly 10. The external-side cable 77 is passes through the second opening 71b other than the first opening 71a formed in the bottom 71c of the numerical key unit 70 and is provided so as to project from the inner side toward the outer side of the casing 71, and is connected to the IC and reader 140. The IC card reader 140 is accommodated and mounted together with the numerical key unit 70 in the mounting portion 12.

Incidentally, a wire length of the main assembly-side cable 76 is determined, on the basis of a wiring path between the USB connector 40a and the numerical key unit 70, so that the main assembly-side cable 76 can be accommodated in the space between the bottom 12b of the mounting portion 12 and the bottom 71c of the numerical key unit 70. Further, a wire length of the external-side cable 77 is a length in which the external-side cable 77 and the connecting cable 145 can be accommodated in the space between the bottom 12b of the mounting portion 12 and the bottom 71c of the numerical key unit 70 in consideration of a wire length of the connecting cable 145 of the IC card reader 140.

As described above, according to the image forming apparatus 1 of this embodiment, the main assembly-side cable 76 and the external-side cable 77 of the numerical key unit 70 are exposed from a lower surface of the casing 71 of the numerical key unit 70. These main assembly-side cable 76 and external-side cable 77 can be accommodated on the lower (down) side D of the numerical key unit 70 and the IC card reader 140 in the mounting portion 12. For this reason, it is possible to suppress that the main assembly-side cable 76 and the external-side cable 77 of the numerical key unit 70, and the USB plug 146 of the IC and reader 140 connected to the numerical key unit 70 are projected toward a side of the image forming apparatus 1 and interfere with another mode and the like. Further, it is possible to suppress that an outer appearance quality is lowered by bundling the cables on the side or the like of the image forming apparatus 1 or by fixing the cables to an outer surface of the apparatus main assembly. By this, the numerical key unit 70 and the IC card reader 140 can be suitably disposed, so that it becomes possible to make a good arrangement also from a design viewpoint without increasing an installation area more than necessary. Accordingly, according to the image forming apparatus 1 of this embodiment, upsizing of the apparatus main assembly 10 with connection thereto of the numerical key unit 70 by the main assembly-side cable 76 and the external-side cable 77 while the numerical key unit 70 for external attachment is connectable to the image forming apparatus 1 by the main assembly-side cable 76.

Further, according to the image forming apparatus 1 of this embodiment, the main assembly-side cable 76, the external-side cable 77, and the connecting cable 145 can be accommodated so as not to be viewed from the user, so that it is possible to prevent that connection of the plug and the receptacle is inadvertently eliminated (disconnected). Further, according to the image forming apparatus 1 of this embodiment, the IC and reader 140 is mounted on the mounting portion 12, in addition to the numerical key unit 70, and the connecting cable 145 of the IC card reader 140 is also provided so as to project from below the casing 141. For this reason, it is possible to suppress that the connecting cable 145 of the IC card reader 140 projects side ward and interferes with another mode and the like.

Further, according to the image forming apparatus 1 of this embodiment, in the case where the IC card reader 140 is not mounted, the external-side cable 77 can be accommodated in an accommodating space, i.e., in a space below the numerical key unit 70. For this reason, it is possible to suppress interference of the external-side cable 77 with the peripheral equipment due to exposure of the external-side cable 77 to the outside and erroneous pulling-out of the external-side cable 77 by the user. Further, in this case, a constitution in which a cover mode or the like is provided at a portion, of the mounting portion 12, which is not covered with the numerical key unit 70 may also be employed.

Incidentally, in the above-described example, the case where the numerical key unit 70 includes the external-side cable 77 was described, but the external-side cable 77 may also be absent. Also, in this case, upsizing of the apparatus main assembly 10 with connection thereto of the numerical key unit 70 by the main assembly-side cable 76 while the numerical key unit 70 for external attachment is connectable to the image forming apparatus 1 by the main assembly-side cable 76.

Further, in this embodiment, as shown in FIG. 8, the case where the first general-purpose connector receptacle 85 and the second general-purpose connector receptacle 86 are disposed on the back (surface) side of the substrate 73 was described, but the present invention is not limited to this. For example, the first general-purpose connector receptacle 85 and the second general-purpose connector receptacle 85 may also be disposed on the front (surface) side (side facing the upper surface cover 72) of the substrate 73. In this case, the first general-purpose connector plug 87 and the second general-purpose connector plug 88 are connected to the first general-purpose connector receptacle 85 and the second general-purpose connector receptacle 86, respectively, on the front surface of the substrate 73. Accordingly, when the main assembly-side cable 76 and the external-side cable 77 are pulled out to the outside of the numerical key unit 70, these cables are pulled out from the openings 71a and 71b of the bottom of the casing 71 by being turned around from the front surface to the back surface of the substrate 73. Also, in this case, upsizing of the apparatus main assembly 10 with connection thereto of the numerical key unit 70 by the main assembly-side cable 76 and the external-side cable 77 while the numerical key unit 70 for external attachment is connectable to the image forming apparatus 1 by the main assembly-side cable 76.

Further, in this embodiment, the case where connection of the image forming apparatus 1, the numerical key unit 70, and the IC card reader 140 is made by communication based on the USB standard and where the main assembly-side cable 76, the external-side cable 77, and the connecting cable 145 are the USB cables was described. However, these cables are not always limited to the cables based on the USB standard, and may also be constituted by general-purpose cables if there is no problem on a transmission quality of a USB signal.

INDUSTRIAL APPLICABILITY

According to the present invention, the input device and the image forming apparatus which are capable of suppressing interference with the peripheral equipment due to exposure of the cable outside and of suppressing erroneous pulling-out of the cable by the user while the input device is an input device for external attachment which is capable of being connected to the image forming apparatus by the cable are provided.

The present invention is not restricted to the foregoing embodiment, but can be variously changed and modified without departing from the spirit and the scope of the present invention. Accordingly, the following claims are attached hereto to make public the scope of the present invention.

This application claims the Conventional Priority from Japanese Patent Application 2019-018771 filed Feb. 5, 2019, all disclosure of which is incorporated by reference herein.

The invention claimed is:

1. An input device mountable on a mounting portion of an image forming apparatus that includes an image forming portion for forming an image on a recording medium and an operating panel including a display screen capable of displaying software numerical keys, as software keys, for inputting numerical information of 0 to 9, respectively, the input device comprising:
   a casing mounted on the mounting portion;
   a hardware numerical key portion as hardware keys capable of inputting information on numerical values of at least 0 to 9;
   a substrate provided in the casing and on which the numerical key portion is mounted;
   a first cable connected to a first connector mounted on the substrate and electrically connecting the image forming apparatus and the input device;
   a first opening through which the first cable is inserted, the first opening being provided in the casing such that in a thickness direction of the substrate, the first cable is exposed to outside of the casing from a surface on a side opposite from a surface where the hardware numerical key portion is provided;
   a second cable connected to a second connector mounted on the substrate and electrically connected to an information reading device capable of electromagnetically reading information of an IC card; and
   a second opening provided such that in the thickness direction of the substrate the second cable is exposed to the outside of the casing from the surface on the side opposite from the surface where the hardware numerical key portion is provided.

2. An input device according to claim 1, wherein the first connector is mounted on the surface of the substrate on the side opposite from the surface where the hardware numerical key portion is mounted with respect to the thickness direction of the substrate.

3. An input device according to claim 1, wherein the second connector is mounted on the surface of the substrate on the side opposite from the surface where the hardware numerical key portion is mounted with respect to the thickness direction of the substrate.

4. An input device according to claim 1, wherein one of the first cable and the second cable includes a plug at a tip, and the other of the first cable and the second cable includes a receptacle at a tip.

5. An input device according to claim 1, wherein the hardware numerical key portion includes:
   a plurality of tactile switches mounted on the substrate; and
   a plurality of operating key portions provided correspondingly to the plurality of tactile switches and provided on the casing such that each of the plurality of tactile switches is made pushable down by being pushed down by a user.

6. An image forming apparatus comprising:
   an image reading device for reading an image of an original;
   an apparatus main assembly including therein the image forming portion for forming the image on a recording material on the basis of a reading result of the image reading portion; and
   an input device according to claim 1.

7. An image forming apparatus according to claim 6, wherein the mounting portion includes a recessed shaped accommodating portion for accommodating and mounting the input device, and
   wherein the first cable is accommodated in the accommodating portion in a state in which the casing is mounted on the apparatus main assembly.

8. An image forming apparatus according to claim 7, wherein the first cable accommodated in the mounting portion is accommodated in a space between a bottom of the mounting portion and the surface of the casing of the input device opposite from the surface where the hardware numerical key portion is provided.

9. An image forming apparatus according to claim 6, wherein the mounting portion is disposed adjacent to the operating panel relative to the apparatus main assembly.

10. An image forming apparatus according to claim 6, wherein the operating panel and the mounting portion are disposed on a front side of the apparatus main assembly.

11. An image forming apparatus according to claim 6, further comprising the information reading device capable of electromagnetically reading information of an IC card,
   wherein the information reading device is accommodated and mounted together with the input device in the mounting portion.

\* \* \* \* \*